(12) United States Patent
Aoki

(10) Patent No.: US 8,547,052 B2
(45) Date of Patent: Oct. 1, 2013

(54) DRIVING CONTROL APPARATUS OF BRUSHLESS MOTOR

(75) Inventor: Masato Aoki, Nagano (JP)

(73) Assignee: Minebea Co., Ltd., Nagano (JP)

( * ) Notice: Subject to any disclaimer, the term of this patent is extended or adjusted under 35 U.S.C. 154(b) by 85 days.

(21) Appl. No.: 13/413,090

(22) Filed: Mar. 6, 2012

(65) Prior Publication Data

US 2012/0293100 A1  Nov. 22, 2012

(30) Foreign Application Priority Data

May 16, 2011  (JP) ................................. 2011-109642

(51) Int. Cl.
*G05B 11/28* (2006.01)
*H02P 6/10* (2006.01)

(52) U.S. Cl.
USPC ................... 318/811; 318/599; 318/400.23

(58) Field of Classification Search
USPC ............................................ 318/599, 400.23
See application file for complete search history.

(56) References Cited

U.S. PATENT DOCUMENTS

| | | | |
|---|---|---|---|
| 6,002,226 A * | 12/1999 | Collier-Hallman et al. | 318/400.23 |
| 6,498,724 B1 * | 12/2002 | Chien | 361/679.47 |
| 6,580,235 B2 * | 6/2003 | Laurent | 318/400.1 |
| 6,710,572 B2 * | 3/2004 | Okubo | 318/727 |

FOREIGN PATENT DOCUMENTS

JP  2008-118830 A  5/2008

* cited by examiner

*Primary Examiner* — Eduardo Colon Santana
*Assistant Examiner* — Bickey Dhakal
(74) *Attorney, Agent, or Firm* — Carrier Blackman & Associates, P.C.; Joseph P. Carrier; William D. Blackman

(57) ABSTRACT

A driving control apparatus includes an inverter circuit, a motor driving circuit and a motor control unit. In performing overlap energization, at a start time of an overlap time period, a pulse width of a first PWM signal at an energization side is widened to increase a number of pulses of a second PWM signal accordingly, and a first PWM signal at an energization side corresponding to a constant voltage side is also widened.

5 Claims, 10 Drawing Sheets

ENLARGED VIEW OF OVERLAP TIME PERIOD A

ENLARGED VIEW OF OVERLAP TIME PERIOD B AND HIGH SIDE

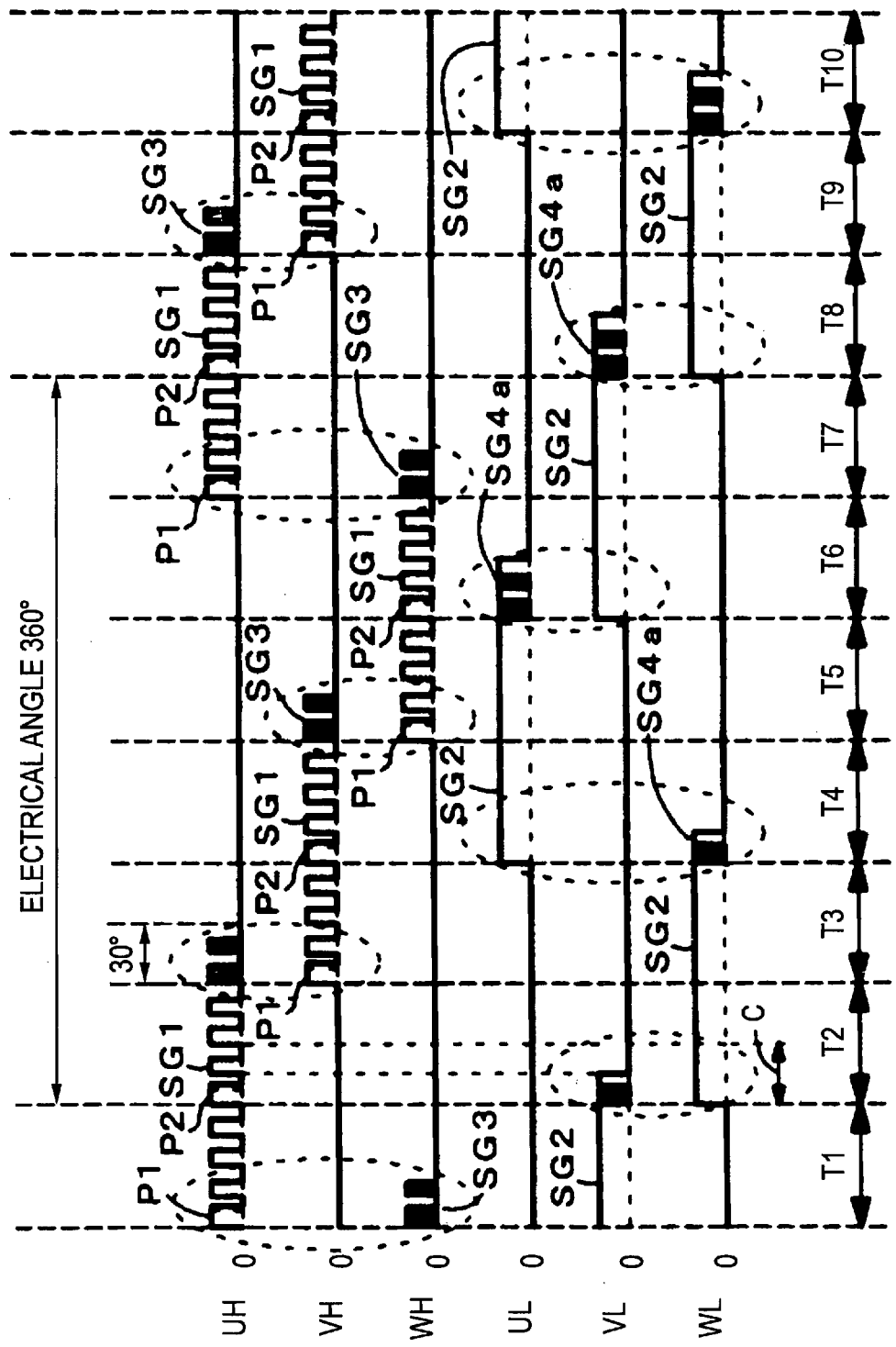

OVERLAP END WHEN HIGH SIDE IS LOW TIME PERIOD

OVERLAP END WHEN HIGH SIDE IS HIGH TIME PERIOD

DRIVING CONTROL APPARATUS OF BRUSHLESS MOTOR

BACKGROUND OF THE INVENTION

1. Field of the Invention

The present invention relates to a driving control apparatus which controls a brushless motor.

2. Description of the Related Art

Causes of vibration and noise of a brushless motor include torque variation. In particular, when performing a driving of 120-degree energization method, a vibration or noise is generated due to torque lowering at the time of commutation.

In order to reduce the torque lowering at the time of commutation, there has been suggested a technique in which a predetermined overlap time period is set at the time of phase switching before and after the commutation (refer to JP 2008-118830 A).

In JP 2008-118830A, when turning on/off a switching element of an inverter apparatus, an upper arm signal and a lower arm signal are made to be PWM (Pulse Width Modulation) signals in the overlap time period, so that an inclination of current change, which is generated at the time of the phase switching, is made to be gentle, thereby suppressing the vibration and noise.

However, the technique of JP 2008-118830 A has following problems.

That is, the PWM signal in the overlap time period is generated based on a carrier frequency. Therefore, it is difficult to arbitrarily adjust a pulse width of the PWM signal. Although the inclination of the current change is made to be gentle, only the stepwise adjustment is possible, so that the suppression effect of the vibration and noise is restrictive.

Also, the PWM signals are generated both at the upper arm side and the lower arm side. Thereby, an operation of a driving circuit of generating the PWM signal is complicated, so that a circuit size may be increased.

Further, the power supply current may be sharply decreased in the overlap time period, so that the torque variation may occur.

SUMMARY OF THE INVENTION

The present invention has been made to solve the above problems. Accordingly, an aspect of the present invention is to provide a driving control apparatus of a brushless motor, which is capable of suppressing vibration and noise at the time of phase switching and preventing a power supply current from being temporarily lowered at the time of the phase switching.

According to an illustrative embodiment of the present invention, there is provided a driving control apparatus of a brushless motor, the driving control apparatus being configured to perform overlap energization for an armature coil having a plurality of phases provided to a stator to rotate a rotor having a plurality of magnetic poles, the driving control apparatus comprising:
an inverter circuit which performs energization for the armature coil having the plurality of phases;
a motor driving circuit which generates a driving signal for driving the inverter circuit, and
a motor control unit which sets an overlap time period of performing the overlap energization and which controls the motor driving circuit based on the overlap time period,
wherein the inverter circuit includes:
a plurality of upper arm switching elements which are provided for the plurality of phases of the armature coil, respectively; and
a plurality of lower arm switching elements which are provided for the plurality of phases of the armature coil, respectively, and are connected to corresponding upper arm switching elements in series, respectively,
wherein at a time of normal driving, for each phase of the armature coil, the motor driving circuit generates the driving signal which includes a first PWM signal which on/off controls one of the upper arm switching element and the lower arm switching element, and generates a constant voltage signal which on/off controls the other of the upper arm switching element and the lower arm switching element,
wherein the motor control unit performs a first driving control and a second driving control for the motor driving circuit in the overlap time period,
wherein the first driving control includes supplying a second PWM signal having a frequency higher than that of the first PWM signal to the upper arm switching element or the lower arm switching element, to which the first PWM signal is supplied immediately before the overlap time period, and, at a start time of the overlap time period, temporally increasing an on-duty of the first PWM signal which is supplied to a switching element of a phase which is switched subsequently, to thus increase a number of pulses of the second PWM signal, and
wherein the second driving control includes supplying a third PWM signal having a frequency higher than that of the first PWM signal to the lower arm switching element or the upper arm switching element, to which the constant voltage signal is supplied immediately before the overlap time period, and supplying the first PWM signal having an on-duty which is temporarily increased, to the upper arm switching element or the lower arm switching element, to which the first PWM signal is supplied during the overlap time period.

According to the above configuration, it is possible to provide a driving control apparatus capable of suppressing vibration and noise at the time of phase switching and preventing power supply current from being temporarily considerably lowered at the time of the phase switching.

BRIEF DESCRIPTION OF THE DRAWINGS

In the accompanying drawings:

FIGS. 5A and 5B are signal waveform diagrams of the second illustrative embodiment;

DETAILED DESCRIPTION

First Illustrative Embodiment

Figure 1:
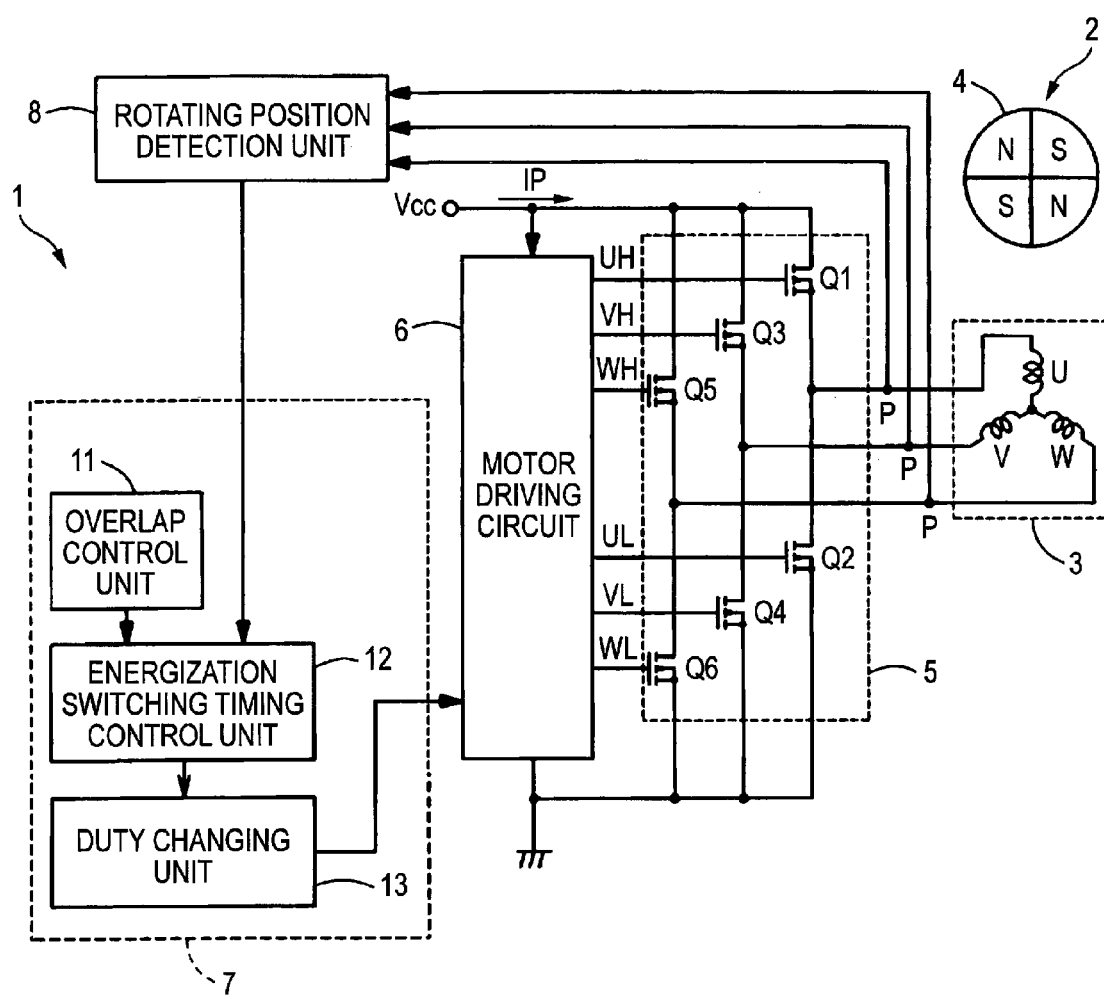
FIG. 1 is a block diagram showing a schematic configuration of a driving control apparatus of a brushless motor 2 according to a first illustrative embodiment of the present invention.

FIG. 1 is a block diagram showing a schematic configuration of a driving control apparatus of a brushless motor 2 according to a first illustrative embodiment of the present invention. The driving control apparatus 1 of FIG. 1 is used for driving control of a three-phase brushless motor 2 (hereinafter, simply referred to as a motor 2), for example, and performs overlap energization for an armature coil 3 having a plurality of phases, which are provided to the motor 2, thereby rotating a rotor 4 of the motor 2. Regarding the motor 2 which is a driving control object, a variety of types may be applied. Also, the number of phases is not particularly limited inasmuch as the number of phases is two or more. In the below, an example in which the three-phase motor 2 is driven is described for simplification of explanations. In the below, the three phases are referred to as a U phase, a V phase and a W phase.

Here, the overlap energization refers to an energization method where at switching a type of the armature coil 3 to which current is supplied, i.e., switching a phase, an overlap time period is provided during which current is concurrently supplied to two types (phases) of the armature coil 3 before and after the switching. The general overlap energization method is known in JP 2008-118830 A, for example. However, this illustrative embodiment provides a unique energization method in the overlap energization, as described later.

A length of the overlap time period can be arbitrarily set according to the number of revolutions. In the driving control apparatus 1 of this illustrative embodiment, the rotor 4 is driven at constant rotating speed (number of revolutions) and a length of the overlap time period at the time of phase switching is pre-set with a predetermined value.

The driving control apparatus 1 of FIG. 1 includes an inverter circuit 5, a motor driving circuit 6, a motor control unit 7 and a rotating position detection unit 8. The inverter circuit 5 has three upper arm switching elements Q1, Q3, Q5 and three lower arm switching elements Q2, Q4, Q6 for respective phases. Each of the upper arm switching elements is connected to a corresponding one of the lower arm switching elements in series.

The upper arm switching elements Q1, Q3, Q5 are configured to switch whether to supply current from a power supply voltage Vcc to the armature coil 3, respectively. In the below, the upper arm side is referred to as an energization side, and the switching element under on state is referred to as an energization phase. Also, the lower arm switching elements Q2, Q4, Q6 are configured to switch whether to supply current having passed through the armature coil 3 to a ground terminal. In the below, the lower arm side is referred to as a constant voltage side, and the switching element under on state is referred to as a constant voltage phase.

The motor control unit 7 has an overlap control unit 11, an energization switching timing control unit 12 and a duty changing unit 13.

The overlap control unit 11 sets an overlap time period and controls switching frequencies of the switching elements Q1 to Q6 in the overlap time period. The energization switching timing control unit 12 controls on/off switching of the switching elements Q1 to Q6. The duty changing unit 13 variably controls on-duty of first, second and third PWM (Pulse Width Modulation) signals SG1, SG3, SG4 in the overlap time period.

Here, the first PWM signal SG1 is PWM signals UH, VH, WH of an energization time period (at the time of normal driving except for the overlap time period) supplied to gates of the upper arm switching elements Q1, Q3, Q5. The second PWM signal SG3 PWM is PWM signals UH, VH, WH of an overlap time period supplied to the gates of the upper arm switching elements Q1, Q3, Q5. The third PWM signal SG4 is PWM signals UL, VL, WL of the overlap time period supplied to gates of the lower arm switching elements Q2, Q4, Q6. The first to third PWM signals SG1, SG3, SG4 are generated by the motor driving circuit 6 under control of the motor control unit 7. Also, the on-duty refers to a ratio of an on-time period of the switching element in one period of the PWM signal.

A connection node of the upper arm switching element Q1 and the lower arm switching element Q2 is connected with one end of the armature coil 3 of the U phase, a connection node of the upper arm switching element Q3 and the lower arm switching element Q4 is connected with one end of the armature coil 3 of the V phase, and a connection node of the upper arm switching element Q5 and the lower arm switching element Q6 is connected with one end of the armature coil 3 of the W phase.

The motor driving circuit 6 outputs the first PWM signal SG1 for controlling the on/off of the upper arm switching elements Q1, Q3, Q5 and the constant voltage signal SG2 for controlling the on/off of the lower arm switching elements Q2, Q4, Q6 at the time of normal driving (which indicates the energization time period except for the overlap time period). The constant voltage signal SG2 is signals UL, VL, WL which are output from the motor driving circuit 6, become a high level only for a specific phase (i.e., energization phase) and keep a low level for the other phases.

In the below, the first PWM signal SG1 and the constant voltage signal SG2 are collectively referred to as the switching signal. In this illustrative embodiment, the frequency and on-duty (a ratio of an on-time period to a switching period) of the first PWM signal SG1 are fixed values which are determined in advance according to the number of revolutions of the rotor 2.

In this illustrative embodiment, it is assumed that the number of revolutions of the rotor 2 is constant. Accordingly, the frequency and on-duty of the first PWM signal SG1 are basically not changed. However, as described below, in the overlap time period, the on-duty of the first PWM signal SG1 is temporarily changed.

Figure 2A:
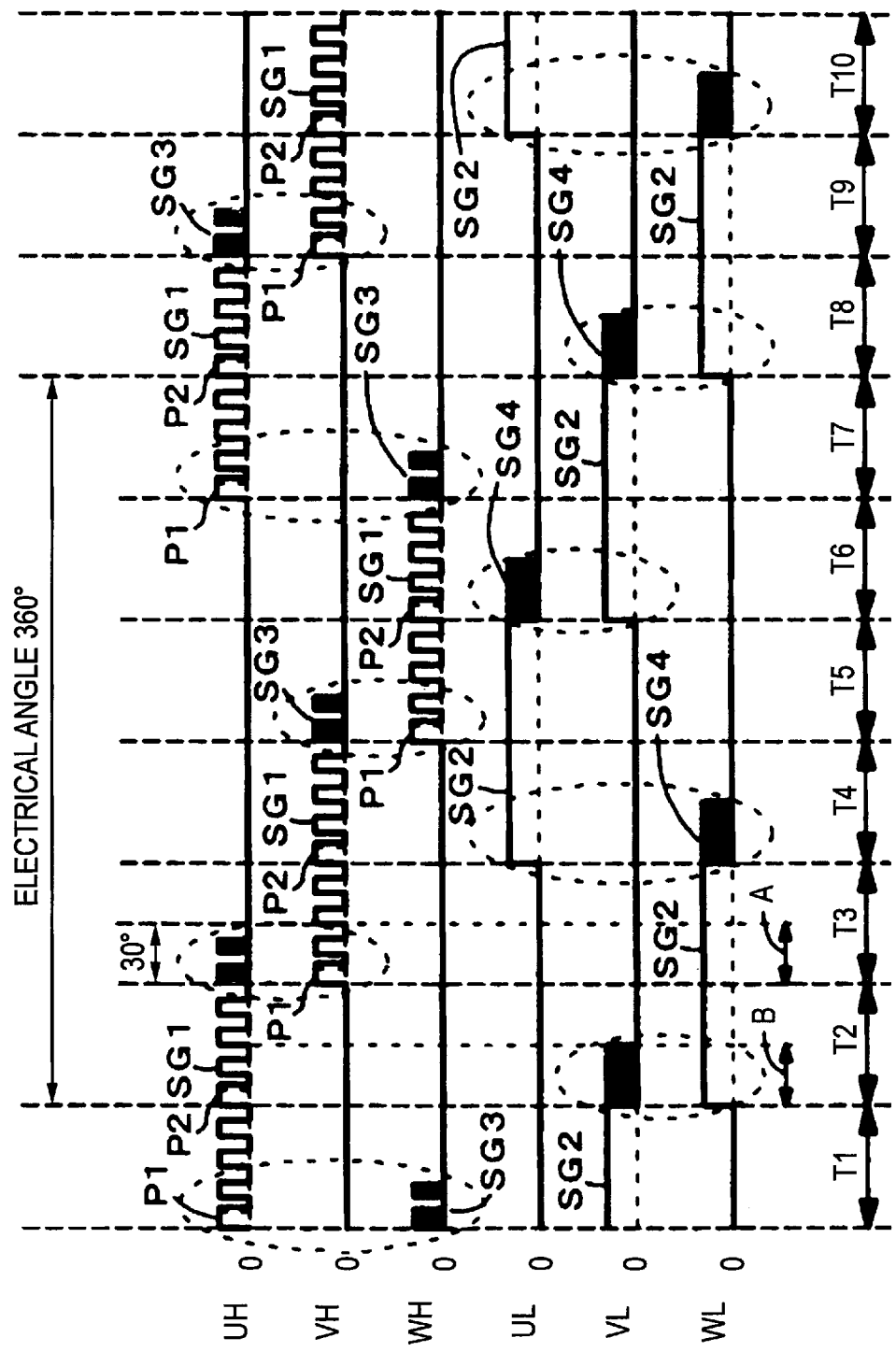
FIG. 2A is signal waveform diagrams of first to third PWM signals SG1, SG3, SG4 and a constant voltage signal SG2 in time periods T1 to T10.
Figure 2B:
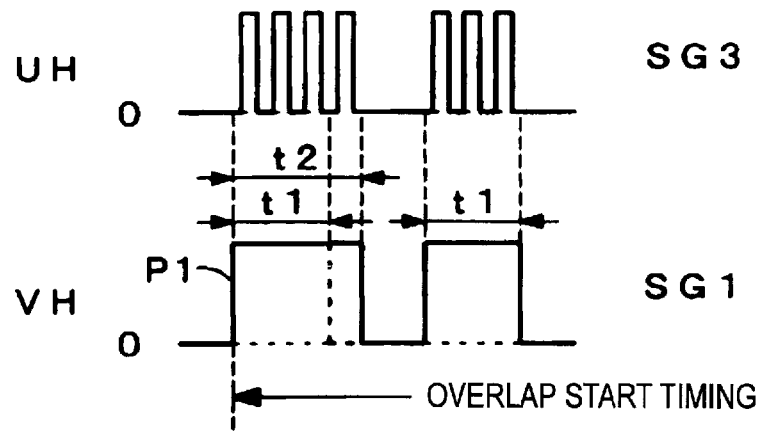
FIG. 2B is an enlarged view of an overlap time period A of a time period T3.
Figure 2C:
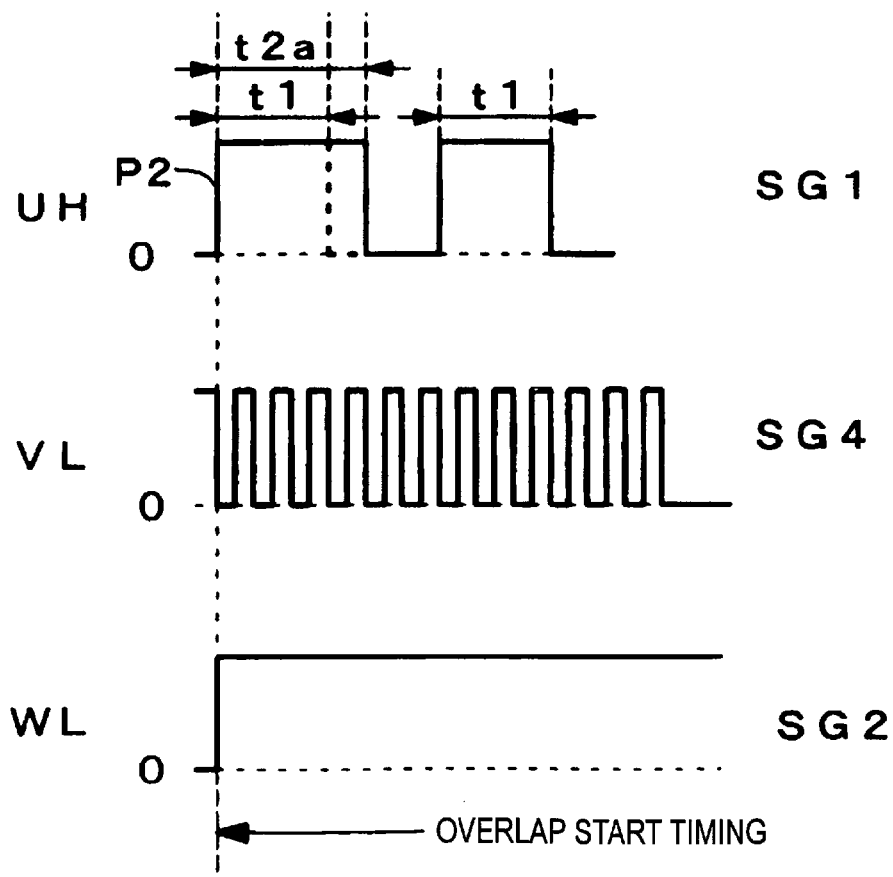
FIG. 2C is an enlarged view of an overlap time period B of a time period T2.

FIGS. 2A to 2C are signal waveform diagrams showing examples of the respective switching signals of the upper arm switching elements Q1, Q3, Q5 and the lower arm switching elements Q2, Q4, Q6 in the first illustrative embodiment. In the waveform diagrams of FIGS. 2A to 2C, when the first PWM signal SG1 or the constant voltage signal SG2 is a high level, the corresponding switching element becomes on.

FIG. 2A is signal waveform diagrams of the first to third PWM signals SG1, SG3, SG4 and the constant voltage signal SG2 in time periods T1 to T10. In FIG. 2A, the overlap time period is shown with a dotted line (surrounded part).

As shown in FIG. 2A, in this illustrative embodiment, the overlap control unit 11 of the motor control unit 7 always set an overlap time period at a timing at which the phase of the first PWM signal SG1 is switched and at a timing at which the phase of the constant voltage signal SG2 is switched. For example, in a time period T3, an overlap time period A is set for the upper arm side U phase and V phase, and in a time period T2, an overlap time period B is set for the lower arm side V phase and W phase.

FIG. 2B is an enlarged view of the overlap time period A of the time period T3 and FIG. 2C is an enlarged view of the overlap time period B of the time period T2.

As can be seen from FIG. 2B, the second PWM signal SG3 having a frequency higher than that of the first PWM signal SG1 is generated and the first PWM signal SG1 is replaced with the second PWM signal SG3 in the overlap time period of the time period T3 by the overlap control unit 11. More specifically, the second PWM signal SG3 is supplied to the switching element Q1 of the upper arm side U phase at a timing when the first PWM signal SG1 of the V phase, which is subsequently switched, raises, in the overlap time period A of the time period T3.

The second PWM signal SG3 is set by the overlap control unit 11 every high level time period of the first PWM signal SG1 in the overlap time period. That is, the high and low states are repeated in the high level time periods of the first PWM signal SG1, so that the second PWM signal SG3 is generated. Therefore, the second PWM signal SG3 is a PWM signal which is output from the motor driving circuit 6 only in each high level time period of the first PWM signal SG1 in the overlap time period.

Also, in this illustrative embodiment, at the start time of the overlap time period A, the duty changing unit 13 temporarily increases the on-duty of the first PWM signal SG1 of the V phase, which is subsequently switched, thereby temporarily widening a pulse width from t1 to t2. Together with this, the number of pulses of the second PWM signal SG3 of the U phase to be overlap-driven is increased. For example, in the example of FIG. 2B, the number of pulses of the second PWM signal SG3 of the U phase is increased from 3 (three) to 4 (four).

That is, in this illustrative embodiment, at the start time of the overlap time period, for the upper arm side U and V phases which are energized, the pulse width of the first PWM signal SG1 is widened such that energization time is prolonged, and the number of pulses of the second PWM signal SG2 is correspondingly increased. Thereby, immediately after the overlap time period starts, the energization time period is prolonged, so that it is possible to suppress the power supply current from being lowered at the time of the phase switching.

In the meantime, in an overlap time period B of the time period T2, as shown in FIG. 2C, the third PWM signal SG4 is supplied to the V phase, to which the constant voltage has been supplied, in the high level time period of the constant voltage signal SG2 of the lower arm side W phase which is subsequently switched.

In the example of FIG. 2C, in the high level time period of the constant voltage signal SG2 in the overlap time period B, the overlap control unit 11 sets the third PWM signal SG4 having 12 pulses, which is then output from the motor driving circuit 6 to the lower arm side V phase. Differently from the second PWM signal SG3 shown in FIG. 2B, the third PWM signal SG4 is output with the same period without interruption.

Also, in this illustrative embodiment, at the start time of the overlap time period B, the duty changing unit 13 temporarily increases the on-duty of the first PWM signal SG1 of the energization-side U phase, thereby temporarily widening the pulse width from t1 to t2a.

That is, in this illustrative embodiment, at the start time of the overlap time period of the constant voltage phase, the pulse width of the first PWM signal SG1 is temporarily widened such that the energization time of the energization side U phase is prolonged. Thereby, immediately after the overlap time period of the constant voltage phase starts, the energization time period is prolonged, so that it is possible to suppress the power supply current from being lowered at the time of the phase switching.

Figure 3A:
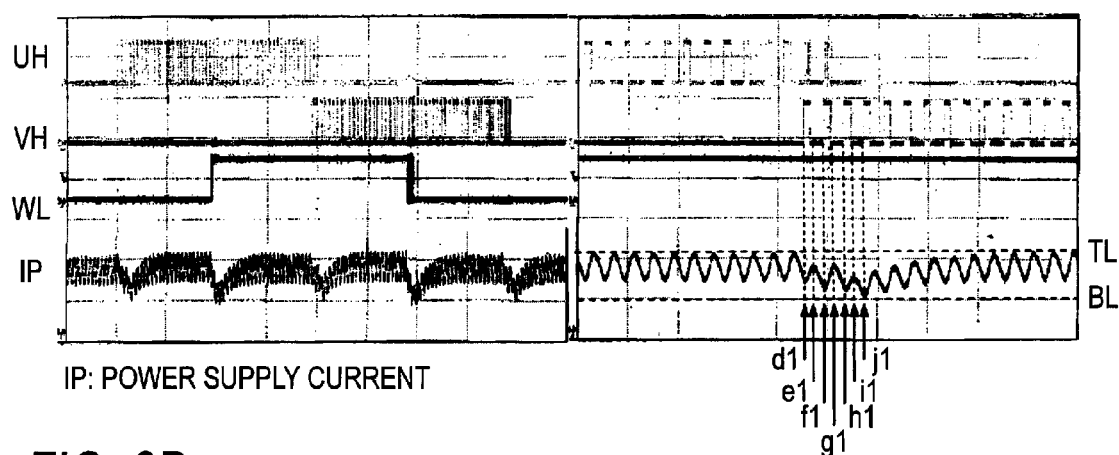
FIG. 3A is waveform diagrams of a case where an overlap control unit 11 is provided but a duty changing unit 13 is not provided.
Figure 3B:
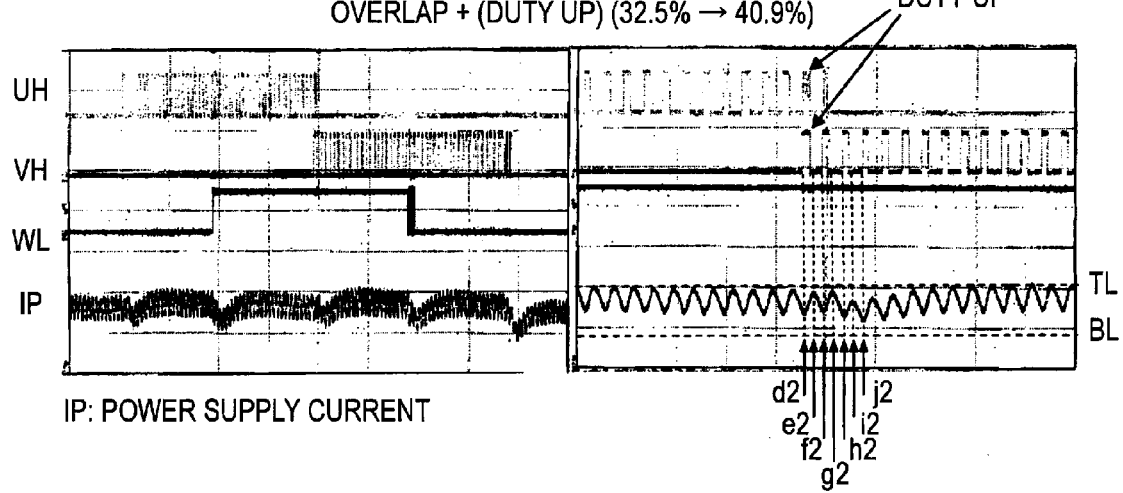
FIG. 3B is waveform diagrams of a case where the overlap control unit 11 and the duty changing unit 13 are provided.

FIG. 3A and 3B show power supply current waveforms of the upper arm side in the first illustrative embodiment. Left halves of FIG. 3A and 3B are waveform diagrams of a time period in which an electrical angle is about 360°, and right halves are enlarged waveform diagrams in an overlap time period which is a part of the left halves.

Specifically, FIG. 3A is waveform diagrams of a case where the overlap control unit 11 is provided but the duty changing unit 13 is not provided, and FIG. 3B is waveform diagrams of a case where the overlap control unit 11 and the duty changing unit 13 are provided. FIG. 3B shows an example in which the on-duty is increased from 32.5% to 40.9% by the duty changing unit 13.

Time periods d1 to j1 of FIG. 3A and time periods d2 to j2 of FIG. 3B are timings corresponding to each other, respectively, and are overlap time periods and time periods immediately thereafter. In FIGS. 3A and 3B, in order to easily compare magnitudes of the power supply currents IP, peak values of the power supply currents IP are shown with dotted lines TL, and bottom values of the power supply currents IP are shown with a dotted line BL.

As can be seen from FIGS. 3A and 3B, the lowering of the power supply current IP during the upper arm side time periods d2 to j2 is smaller than that of the power supply current IP during the time periods d1 to j1. That is, in this illustrative embodiment, the duty changing unit 13 is provided, the on-duty of the first PWM signal SG1 of the V phase, which is subsequently switched, is temporarily increased to quickly increase the V phase current at the start time of the upper arm side overlap time period, and the pulses of the second PWM signal SG3 of the U phase, which is overlap-driven, are increased to intentionally suppress the lowering of the U phase current, so that it is possible to suppress the lowering of the power supply current IP at the time of the phase switching.

Figure 4A:
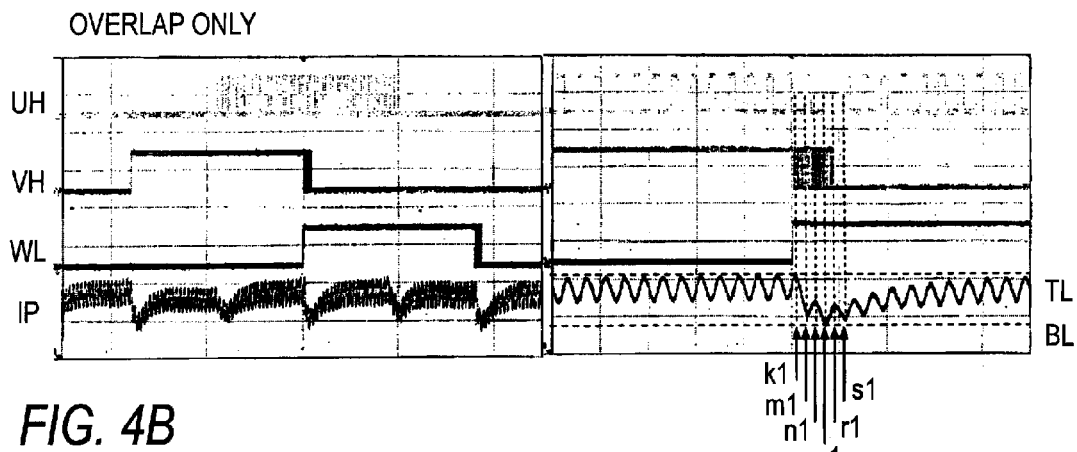
FIGS. 4A and 4B are views showing power supply current waveforms of a lower arm side in the first illustrative embodiment, wherein left halves show waveform diagrams in a time period in which an electrical angle is about 360°.
Figure 4B:
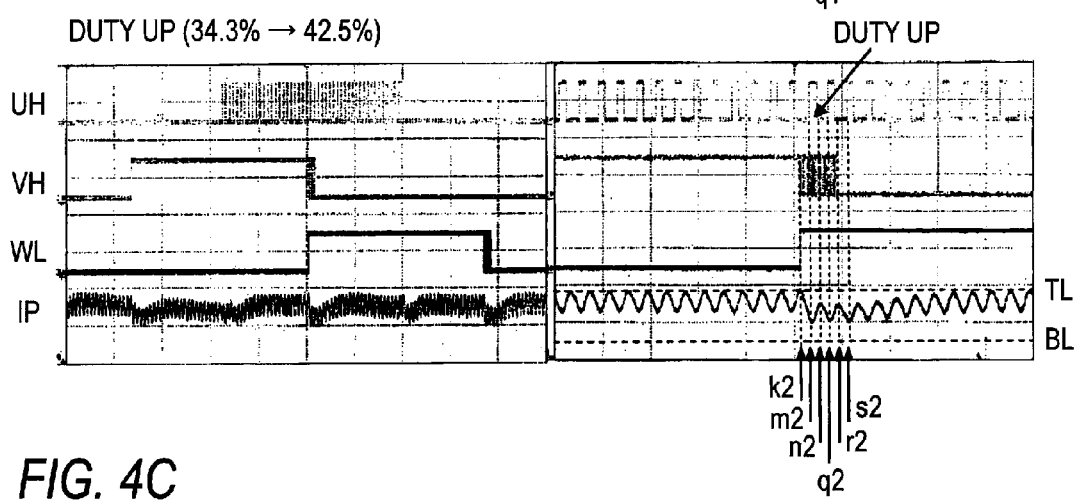

FIGS. 4A and 4B show power supply current waveforms of the lower arm side in the first illustrative embodiment. Left halves of FIGS. 4A and 4B are waveform diagrams of a time period in which an electrical angle is about 360°, and right halves are enlarged waveform diagrams in an overlap time period which is a part of the left halves. FIG. 4B shows an example in which the on-duty is increased from 34.3% to 42.5% by the duty changing unit 13.

Time periods k1 to s1 of FIG. 4A and time periods k2 to s2 of FIG. 4B are timings corresponding to each other, respectively, and are overlap time periods and time periods immediately thereafter. In FIGS. 4A and 4B, in order to easily compare magnitudes of the power supply currents IP, peak values of the power supply currents IP are shown with dotted lines TL, and bottom values of the power supply currents IP are shown with a dotted line BL.

As can be seen from FIGS. 4A and 4B, the lowering of the power supply current IP during the lower arm side time periods k2 to s2 is smaller than that of the power supply current IP during the time periods k1 to s1. That is, the duty changing unit 13 is provided, and the on-duty of the first PWM signal SG1 of the U phase, which is the upper arm side energization phase, is temporarily increased at the start time of the lower arm side overlap time period, so that it is possible to suppress the lowering of the power supply current IP at the time of the phase switching.

In the meantime, regarding the degree of increasing the on-duty at the start time of the overlap time period, it is preferable to set an optimal value for each motor at design stage by a simulation, a parameter test and the like, for example.

Also, in this illustrative embodiment shown in FIGS. 2 to 4, the on-duty is increased only for the first one pulse of the first PWM signal SG1 at the start time of the overlap time period. However, the on-duty may be increased for a plurality of pulses at the start time of the overlap time period. At this time, an increase ratio of the on-duty may be changed for each pulse. For example, the increase ratio of the on-duty for the first pulse may be set to be maximal and the increase ratio of the on-duty for one or more pulses thereafter may be set to be gradually smaller.

The frequency and on-duty of the second and third PWM signals SG3, SG4 are controlled by the motor control unit 7 and are not necessarily fixed values. However, in this illustrative embodiment, they are fixed values. For example, the first PWM signal SG1 is set to be 16 kHz and the second and third PWM signals SG3, SG4 are set to be 270 kHz. In the meantime, the second PWM signal SG3 and the third PWM signal SG4 are not necessarily set to be the same frequency. However, when they are set to be the same frequency, it is possible to simplify the internal configurations of the motor control unit 7 which controls the signals and the motor driving circuit 6 which outputs the signals under control of the motor control unit 7.

As explained above, the frequency and on-duty of the second and third PWM signals SG3, SG4 can be arbitrarily set. However, in general, if the frequency of the second and third PWM signals SG3, SG4 is set higher, an inclination of the phase current flowing in the armature coil 3 at the time of the phase switching becomes gentler, so that the vibration and noise of the motor 2 can be suppressed more efficiently. On the other hand, when the frequency is set to be high, switching losses of the switching elements Q1 to Q6 are increased. Therefore, it is preferable to set the optimal frequency, considering this tradeoff. Regarding the conditions of setting the frequency of the second and third PWM signals SG3, SG4, types and electric properties (for example, increase/decrease response and the like) of the respective circuit elements which are used in the switching elements Q1 to Q6 and peripheral circuits thereof, lengths of the overlap time periods and the like are considered. It is preferable to determine the frequency while totally considering those conditions.

In the example of FIG. 2A, the overlap time period is defined based on the electrical angle (30° in FIG. 2A). However, this is just exemplary, and the overlap time period may be defined with time, rather than the electrical angle. Also, the specific overlap time period may be determined in advance, considering the design specification and the like of the motor 2 which is the driving object. Alternatively, the overlap time period may be adjusted according to the number of revolutions of the motor 2, as described later.

In FIG. 2A, the first PWM signal SG1 is supplied to the upper arm switching elements Q1, Q3, Q5 and the constant voltage signal SG2 is supplied to the lower arm switching elements Q2, Q4, Q6. To the contrary, the constant voltage signal SG2 may be supplied to the upper arm switching elements Q1, Q3, Q5 and the first PWM signal SG1 may be supplied to the lower arm switching elements Q2, Q4, Q6.

As can be seen from FIG. 2A, this illustrative embodiment premises that the upper arm switching elements Q1, Q3, Q5 are PWM controlled and the constant voltage is supplied to the lower arm switching elements Q2, Q4, Q6 for respective phases. Since the lower arm switching elements Q2, Q4, Q6 are supplied with any one of the constant voltages of two types (high level and low level) for respective phases, the control of the lower arm switching elements Q2, Q4, Q6 are referred to as constant voltage control.

By performing the constant voltage control on the lower arm switching elements Q2, Q4, Q6, it is possible to simplify the internal configuration of the motor control unit 7, compared to a case where both the upper and lower arm switching elements are PWM controlled.

The first to third PWM signals SG1, SG3, SG4 and constant voltage signal SG2 described in FIGS. 2A to 2C are output by the motor driving circuit 6 under control of the motor control unit 7.

As described above, the overlap control unit 11 may set the overlap time period with a predetermined value and may adjust the overlap time period, according to the number of revolutions of the motor 2. The energization switching timing control unit 12 determines whether it reaches a switching timing of a phase based on a rotating position of the motor 2, which is detected by the rotating position detection unit 8, and notifies the motor driving circuit 6 of the switching timings of the first to third PWM signals SG1, SG3, SG4 and constant voltage signal SG2. The rotating position detection unit 8 detects the rotating position in a sensor-less manner by an induced voltage which is induced at one end P of each armature coil 3 of the motor 2.

That is, in this illustrative embodiment, the second PWM signal SG3 having a frequency higher than that of the first PWM signal SG1 is supplied to the upper arm switching elements in the overlap time period, to which the first PWM signal SG1 is being supplied at the time of normal driving immediately before the overlap time period. Thereby, the upper arm switching elements of two phases have on state concurrently. And, the third PWM signal SG4 having a frequency higher than that of the first PWM signal SG1 is supplied to the lower arm switching elements in the overlap time period, to which the constant voltage signal SG2 is being supplied at the time of normal driving immediately before the overlap time period. Thereby, the lower arm switching elements of two phases have on state concurrently. As a result, the inclination of the phase current flowing in the overlap time period is made to be gentle, so that it is possible to reduce the torque variation and to largely suppress the vibration and noise of the motor 2.

Also, in this illustrative embodiment, at the start time of the overlap time period, the pulse width of the first PWM signal SG1 is widened (on-duty is increased) at the energization side (upper arm side) and the number of pulses of the second PWM signal SG3 is correspondingly increased. That is, the pulse width of the first PWM signal SG1 is widened (on-duty is increased) at the energization side (upper arm side) corresponding to the lower arm side, on which constant voltage control is performed. Thereby, the power supply current IP easily flows at the start time of the overlap time period, so that it is possible to suppress the lowering of the power supply current IP in the overlap time period.

Second Illustrative Embodiment

In a second illustrative embodiment, the waveform of the third PWM signal SG4 of the lower arm side in the overlap time period is different from that of the first illustrative embodiment.

Figure 5B:
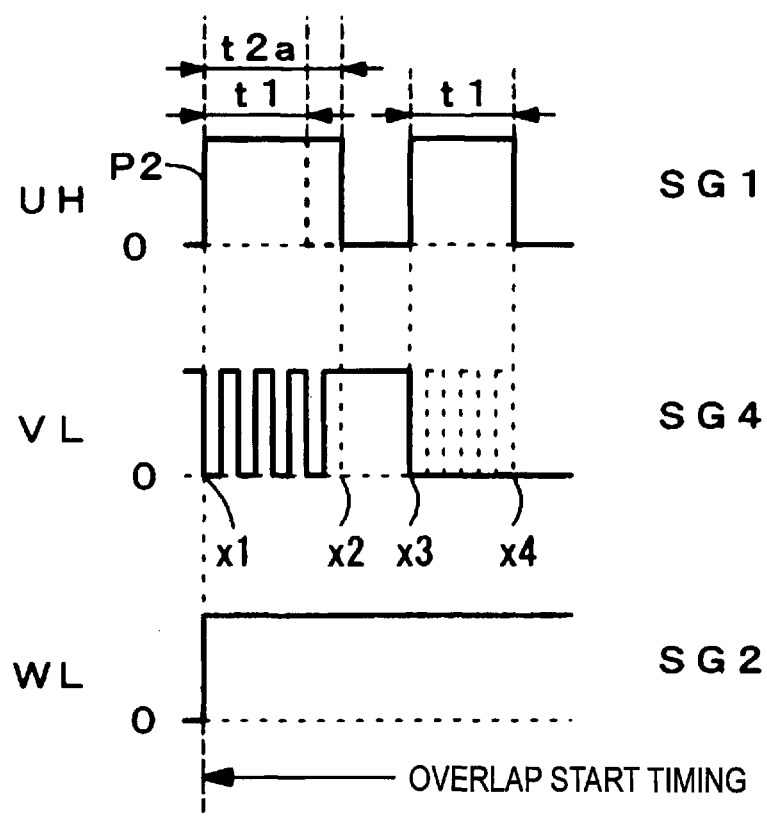

FIGS. 5A and 5B show signal waveforms of the second illustrative embodiment. That is, FIG. 5A shows the signal waveforms of the first to third PWM signals SG1, SG3, SG4 and constant voltage signal SG2 which are supplied to the upper arm switching elements Q1, Q3, Q5 and the lower arm switching elements Q2, Q4, Q6. FIG. 5B is an enlarged view of an overlap time period C in the time period T2 of FIG. 5A.

As shown in FIG. 5B, in the second illustrative embodiment, the third PWM signal SG4 which is supplied to the lower arm switching element is fixed to be high (which means that the switching element is turned on) in a low time period (x2 to x3: which means an off time period of the switching element) of the first PWM signal SG1 which is supplied to the upper arm switching element.

In FIG. 5B, the pulse waveform after the third PWM signal SG4 is fixed to be high is shown with the dotted line. This indicates that after the third PWM signal is fixed to be high (after x3), the same pulse signal as that before the third PWM signal is fixed to be high may continue or may be fixed to be low.

The third PWM signal SG4 is fixed to be high in the low time period of the first PWM signal SG1. Thereby, the on-time period of the lower arm switching element is prolonged in the overlap time period, so that the power supply current IP is more apt to flow. As a result, it is possible to suppress the lowering of the power supply current IP in the overlap time period.

Figure 4C:
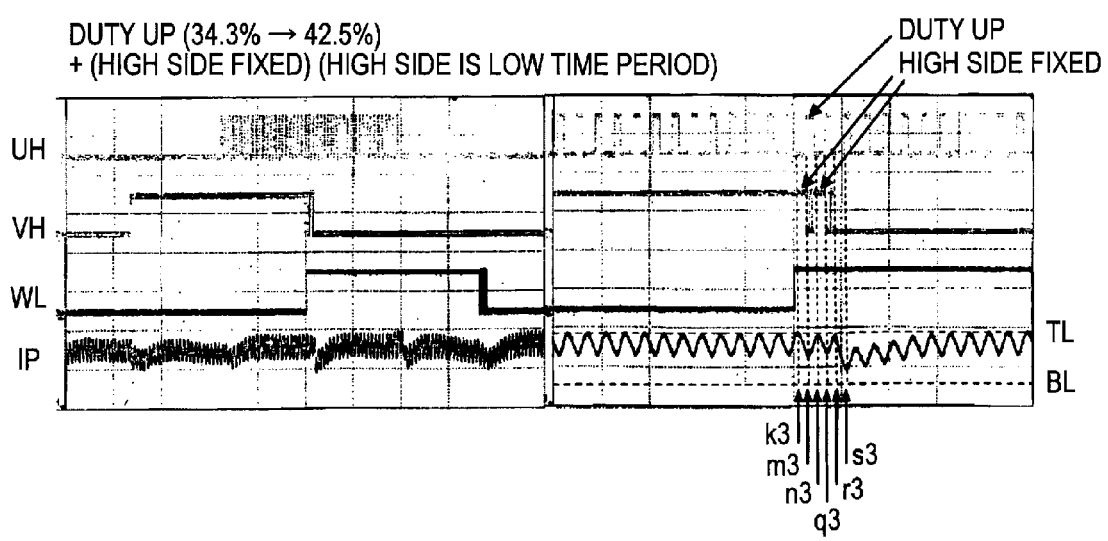
FIG. 4C is a view showing power supply current waveforms corresponding to FIGS. 4A and 4B in a second illustrative embodiment of the present invention.

FIG. 4C shows waveforms of the lower arm side power supply current in the second illustrative embodiment. FIG. 4C shows the signal waveforms with the same scale and denotations as FIGS. 4A and 4B. The time periods k1 to s1 of FIG. 4A and the time periods k2 to s2 of FIG. 4B correspond to time periods k3 to s3 of FIG. 4C.

In FIG. 4B, the on-duty of the first PWM signal SG1 is increased at the start time of the overlap time period. In addition to this, when the third PWM signal SG4 which is supplied to the lower arm switching element is fixed to be high in the low time period of the first PWM signal SG1, as shown in FIG. 4C, it is possible to further suppress the lowering of the power supply current IP.

Meanwhile, in FIGS. 5A and 5B, the third PWM signal SG4 of the lower arm side is fixed to be high, correspondingly to the low time period (x2 to x3) between the two pulses immediately after the overlap time period starts. However, when the first PWM signal SG1 in the overlap time period has a plurality of pulses, the third PWM signal SG4 of the lower arm side may be fixed to be high, correspondingly to all the low time periods between the respective pulses, or the third PWM signal SG4 of the lower arm side may be fixed to be high, correspondingly to a part of the low time periods.

That is, in the second illustrative embodiment, the third PWM signal SG4 of the lower arm side is fixed to be high in the low time period of the first PWM signal SG1 in the overlap time period. Hence, the lowering of the phase current of the phase (V phase in FIG. 4C) for which the energization is interrupted is suppressed, so that it is possible to further suppress the lowering of the power supply current IP in the overlap time period.

Third Illustrative Embodiment

In a third illustrative embodiment, the overlap time period of the lower arm side starts in a pulse output time period (=on-time period of the switching element) of the first PWM signal SG1 of the upper arm side.

Figure 6A:
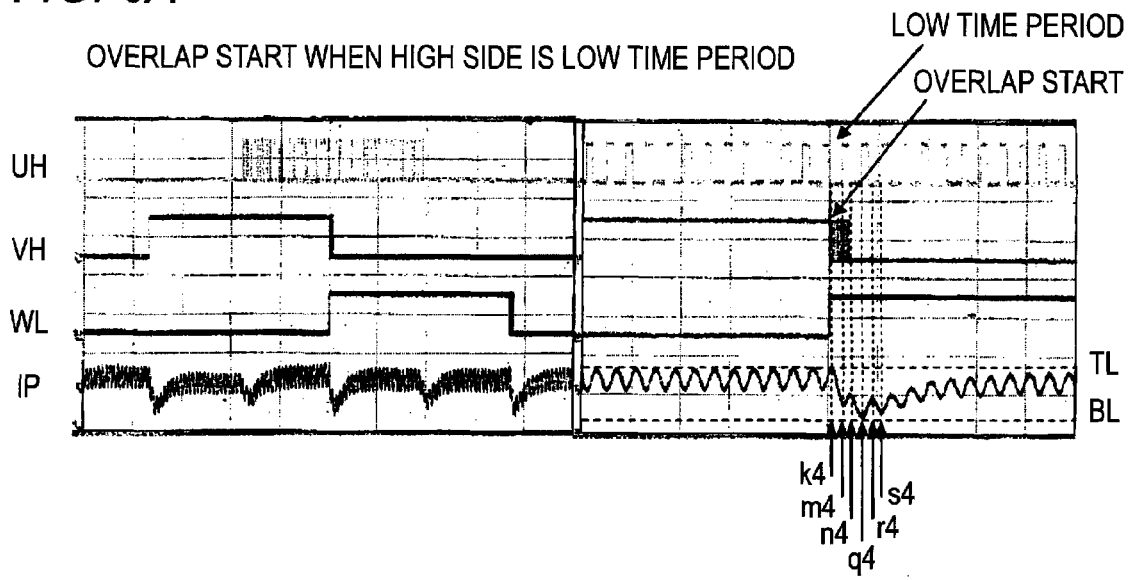
FIG. 6A is signal waveform diagrams of a case where an overlap time period of a lower arm side starts in a time period in which a first PWM signal SG1 of an upper arm side is low.
Figure 6B:
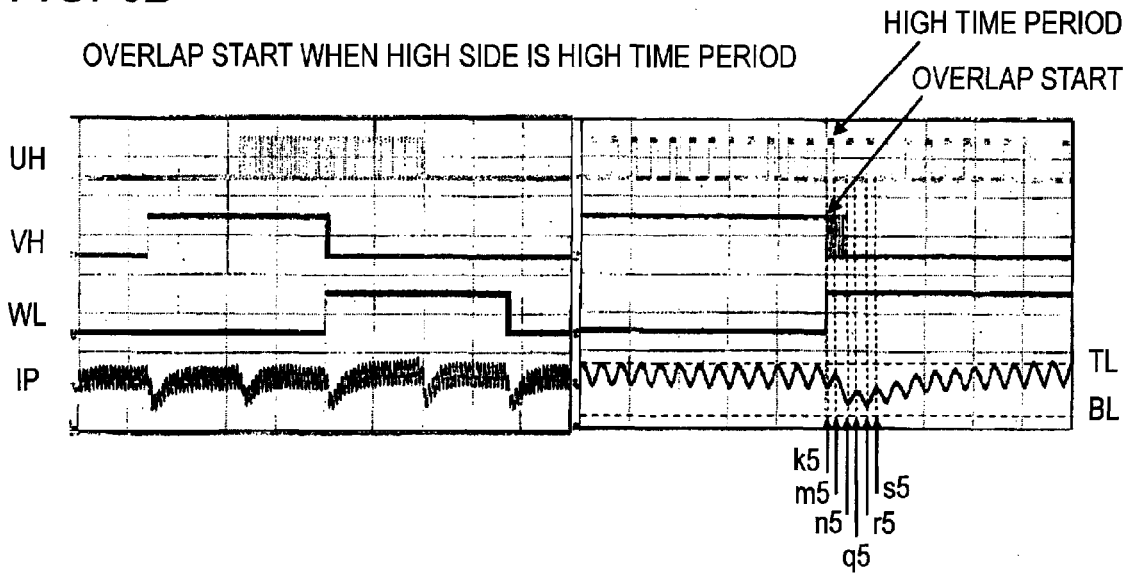
FIG. 6B is signal waveform diagrams of a case where the overlap time period of the lower arm side starts in a time period in which the first PWM signal SG1 of the upper arm side is high, according to a third illustrative embodiment of the present invention.

FIGS. 6A and 6B show signal waveforms of the respective switching signals of the upper arm switching element Q1 and lower arm switching elements Q4, Q6 and the power supply current IP.

FIG. 6A is signal waveform diagrams of a case where the overlap time period of the lower arm side starts in a time period in which the first PWM signal SG1 of the upper arm side is low, and FIG. 6B is signal waveform diagrams of a case where the overlap time period of the lower arm side starts in a time period (pulse output time period) in which the first PWM signal SG1 of the upper arm side is high.

Time periods k4 to s4 of FIG. 6A are an overlap time period and time periods just thereafter. The time periods k4 to s4 correspond to time periods k5 to s5 of FIG. 6B.

As can be seen from the comparison of the power supply currents IP in the overlap times periods of FIGS. 6A and 6B, when the overlap time period of the lower arm side starts in the pulse output time period of the first PWM signal SG1 of the upper arm side, the lowering of the power supply current IP during the overlap time period is reduced. The reason is that if the lower arm switching element is also on when the upper arm switching element is on, the power supply current IP flows through both the switching elements, so that the lowering of the power supply current is reduced.

More precisely, it is preferable that the overlap time period of the lower arm side starts at the substantially same time with the start of the pulse output time period of the first PWM signal SG1 of the upper arm side. However, even after predetermined time elapses from the start of the pulse output time period of the first PWM signal SG1 of the upper arm side, when the elapsed time is in the pulse output time period, the overlap time period of the lower arm side is made to start, so that it is possible to suppress, to some extent, the lowering of the power supply current IP in the overlap time period.

In the meantime, the third illustrative embodiment can be combined with the first or second illustrative embodiment. That is, also in the third illustrative embodiment, like FIGS. 2B and 2C, the pulse width of the first PWM signal SG1 is widened and the number of pulses of the second PWM signal SG3 is increased immediately after the overlap time period starts. In addition to this, like FIG. 5B, the third PWM signal SG4 of the lower arm side may be fixed to be high in the low time period of the first PWM signal SG1 in the overlap time period.

That is, in the third illustrative embodiment, the overlap time period of the lower arm side starts in the pulse output time period of the first PWM signal SG1 of the upper arm side. Hence, the lowering of the phase current of the phase (V phase in FIG. 6B) for which the energization is interrupted is suppressed and the phase current of the phase (W phase in FIG. 6B) for which the energization starts is quickly increased, so that it is possible to suppress the lowering of the power supply current IP in the overlap time period.

Fourth Illustrative Embodiment

In a fourth illustrative embodiment, the overlap time period of the lower arm side ends in the pulse output time period (=on-time period of the switching element) of the first PWM signal SG1 of the upper arm side.

Figure 7A:
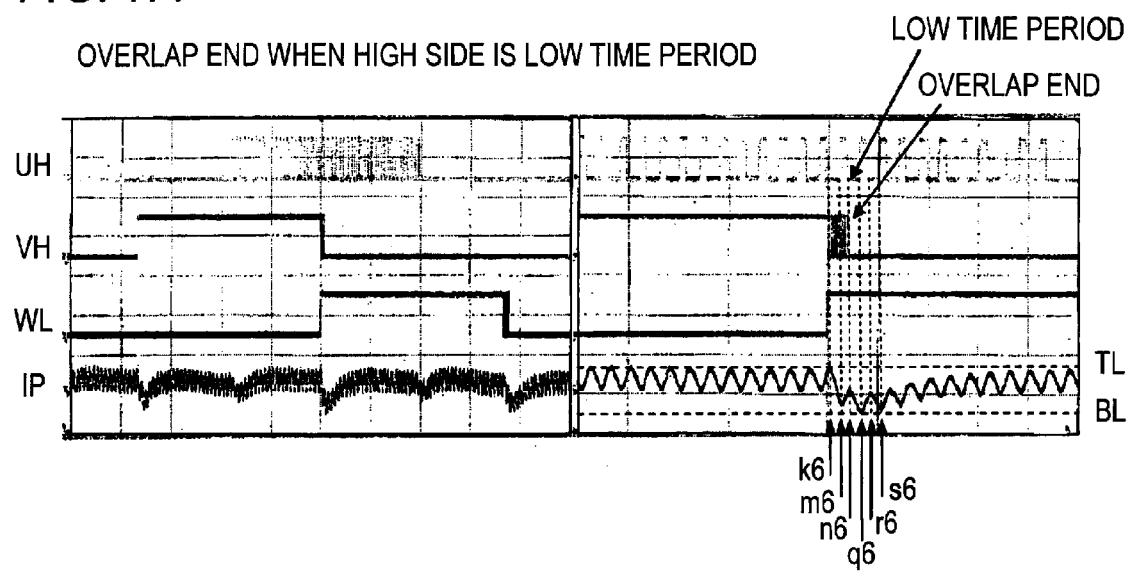
FIG. 7A is signal waveform diagrams of a case where an overlap time period of a lower arm side ends in a time period in which a first PWM signal SG1 of an upper arm side is low.
Figure 7B:
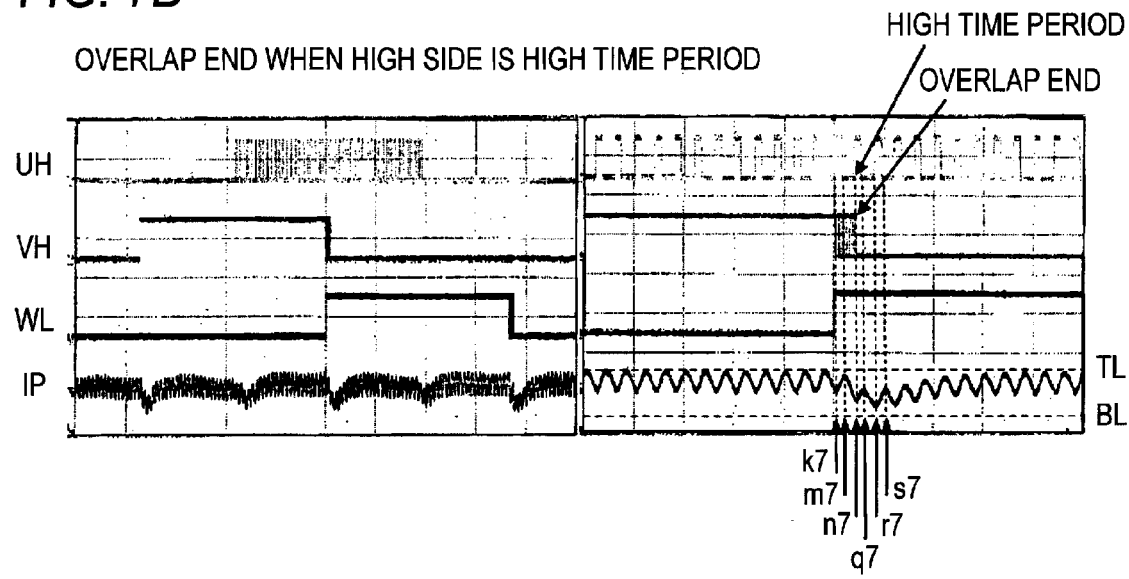
FIG. 7B is signal waveform diagrams of a case where the overlap time period of the lower arm side ends in a time period in which the first PWM signal SG1 of the upper arm side is high, according to a fourth illustrative embodiment of the present invention.

FIGS. 7A and 7B show signal waveforms of the respective switching signals of the upper arm switching element Q1 and lower arm switching elements Q4, Q6 and the power supply current IP.

FIG. 7A is signal waveform diagrams of a case where the overlap time period of the lower arm side ends in a time period in which the first PWM signal SG1 of the upper arm side is low, and FIG. 7B is signal waveform diagrams of a case where the overlap time period of the lower arm side ends in a time period (pulse output time period) in which the first PWM signal SG1 of the upper arm side is high.

Time periods k6 to s6 of FIG. 7A are an overlap time period and time periods immediately thereafter. The time periods k6 to s6 correspond to time periods k7 to s7 of FIG. 7B.

As can be seen from the comparison of the power supply currents IP in the overlap times periods of FIGS. 7A and 7B, when the overlap time period of the lower arm side ends in the pulse output time period of the first PWM signal SG1 of the upper arm side, the lowering of the power supply current IP during the overlap time period is reduced. The reason is that if the lower arm switching element is also on when the upper arm switching element is on, the power supply current IP flows through both the switching elements, so that the lowering of the power supply current is reduced.

The fourth illustrative embodiment can be arbitrarily combined with the first to third illustrative embodiments. That is, also in the fourth illustrative embodiment, like FIGS. 2B and 2C, the pulse width of the first PWM signal SG1 is widened and the number of pulses of the second PWM signal SG3 is increased immediately after the overlap time period starts. In addition to this, like FIG. 5B, the third PWM signal SG4 of the lower arm side may be fixed to be high in the low time period of the first PWM signal SG1 in the overlap time period. Also, like the third illustrative embodiment, the overlap time period of the lower arm side may start in the pulse output time period of the first PWM signal SG1 of the upper arm side.

That is, in the fourth illustrative embodiment, the overlap time period of the lower arm side ends in the pulse output time period of the first PWM signal SG1 of the upper arm side. Hence, the power supply current IP is more apt to flow, so that it is possible to suppress the lowering of the power supply current IP in the overlap time period.

Fifth Illustrative Embodiment

In a fifth illustrative embodiment, the overlap time period and the on-duty of the second and third PWM signals SG3, SG4 are adjusted according to the number of revolutions.

Figure 8:
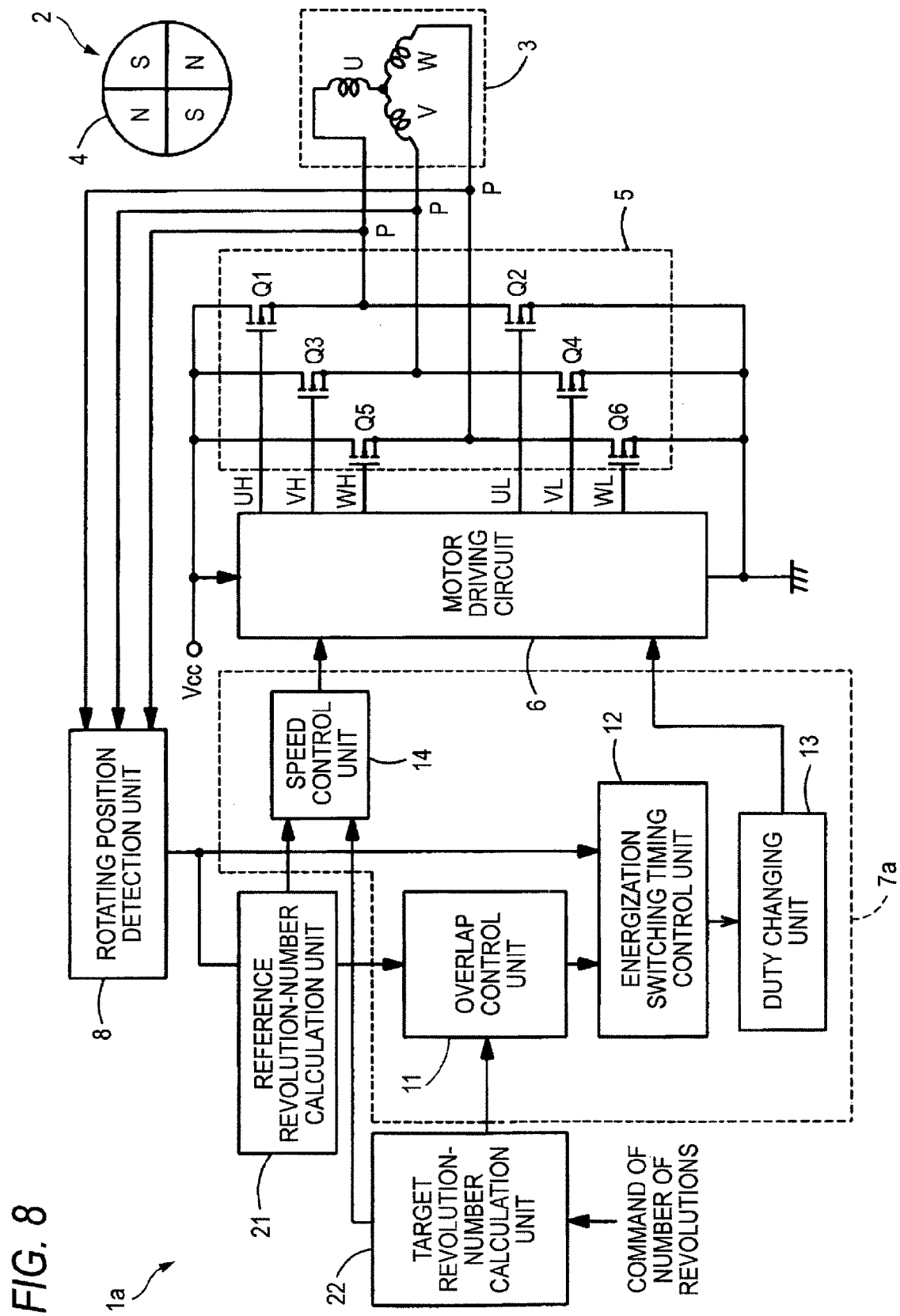
FIG. 8 is a block diagram showing a schematic configuration of a driving control apparatus 1a of a brushless motor 2 according to a fifth illustrative embodiment of the present invention.

FIG. 8 is a block diagram showing a schematic configuration of a driving control apparatus 1a of the brushless motor 2 according to the fifth illustrative embodiment of the present invention. In FIG. 8, the parts common to FIG. 1 are indicated with the same reference numerals and the differences therebetween are described in the below.

The driving control apparatus 1a of FIG. 8 has a reference revolution-number calculation unit 21, a target revolution-number calculation unit 22 and a speed control unit 14, in addition to the configuration of FIG. 1. The reference revolution-number calculation unit 21 calculates the number of revolutions (hereinafter, referred to as the reference number of revolutions) of the rotor 4 at predetermined reference time, based on the rotating position of the rotor 4 detected by the rotating position detection unit 8. The target revolution-number calculation unit 22 calculates a target value (hereinafter, referred to as the target number of revolutions) of the number of revolutions of the rotor 4, based on a command of the number of revolutions, which is supplied from the outside of the driving control apparatus 1a.

The speed control unit 14 which is provided in a motor control unit 7a generates a speed control signal for controlling the rotating speed of the rotor 4, based on the reference number of revolutions calculated in the reference revolution-number calculation unit 21 and the target number of revolutions calculated in the target revolution-number calculation unit 22, and supplies the generated speed control signal to the motor driving circuit 6. The overlap control unit 11 in the motor control unit 7a determines an overlap time period, switching signals which are output to the switching elements of the respective phases from the motor driving circuit 6 in the overlap time period and two phases to be overlapped, based on the reference number of revolutions calculated in the reference revolution-number calculation unit 21 and the target number of revolutions calculated in the target revolution-number calculation unit 22, and notifies the energization switching timing control unit 12 of the determined information.

The speed control unit 14 in the motor control unit 7a adjusts the on-duty of the second PWM signal SG3 which is output by the motor driving circuit 6, based on the target number of revolutions calculated in the target revolution-number calculation unit 22. Here, the on-duty indicates a ratio of the on-time period of the switching element.

That is, in the fifth illustrative embodiment, the on-duty of the second PWM signal SG3 is adjusted according to the target number of revolutions. Thereby, it is possible to optimize the inclination of the phase current, according to the target number of revolutions of the motor 2, so that it is possible to suppress the vibration and noise of the motor 2 more efficiently. In the meantime, even when the on-duty of the second PWM signal SG3 is adjusted according to the reference number of revolutions, not the target number of revolutions, it is possible to obtain the same effects.

Also, in the fifth illustrative embodiment, the overlap time period is set, based on the target number of revolutions and the reference number of revolutions. Therefore, since it is possible to perform the overlap energization, considering the actual rotating circumstances of the motor 2, it is possible to enhance the effect of suppressing the vibration and noise while driving the motor 2 more stably.

Other Modified Illustrative Embodiments

In the above illustrative embodiments, it is assumed that the switching speeds of the upper arm switching elements Q1, Q3, Q5 and lower arm switching elements Q2, Q4, Q6 are the substantially same, so that the on-duty of the second PWM signal SG3 is set without distinguishing the upper arm side and lower arm side. However, a case can be also considered in which the switching speeds are different between the upper arm side and the lower arm side. In this case, it is preferable to change the on-duty of the second PWM signal SG3 at the upper arm side and the lower arm side. Specifically, at the upper arm side and the lower arm side, it is preferable to make the on-duty of the second PWM signal SG3 of the switching element having the slower switching speed larger.

The rotating position detection unit 8 detects the induced voltages which are induced at the respective phases of the armature coil 3 by the sensor-less manner. However, a position sensor for detecting a rotating position of the rotor 4 may be provided and the rotating position may be detected by a signal from the position sensor.

Also, the second PWM signal SG3 is not limited to the PWM signal which is output only in each high level time period of the first PWM signal SG1 in the overlap time period shown in FIG. 2B. The second PWM signal SG3 may be a PWM signal which is output in all time periods or a part of the respective low level time periods of the first PWM signal SG1 in the overlap time period and enables the inclination of the phase current to be finely adjusted, according to operation conditions of the motor.

Also, the third PWM signal SG4 is not limited to the PWM signal which is continuously output in the overlap time period shown in FIG. 2C. The third PWM signal SG4 may be a PWM signal which is not output in a part of the overlap time period and is intermittently output and enables the inclination of the phase current to be finely adjusted, according to the operation conditions of the motor.

While the present invention has been shown and described with reference to certain illustrative embodiments thereof, it will be understood by those skilled in the art that various changes in form and details may be made therein without departing from the spirit and scope of the invention as defined by the appended claims.

What is claimed is:

1. A driving control apparatus of a brushless motor, the driving control apparatus being configured to perform overlap energization for an armature coil having a plurality of phases provided to a stator to rotate a rotor having a plurality of magnetic poles, the driving control apparatus comprising:
   an inverter circuit which performs energization for the armature coil having the plurality of phases;
   a motor driving circuit which generates a driving signal for driving the inverter circuit, and
   a motor control unit which sets an overlap time period of performing the overlap energization and which controls the motor driving circuit based on the overlap time period,
   wherein the inverter circuit includes:
      a plurality of upper arm switching elements which are provided for the plurality of phases of the armature coil, respectively; and
      a plurality of lower arm switching elements which are provided for the plurality of phases of the armature coil, respectively, and are connected to corresponding upper arm switching elements in series, respectively,
   wherein at a time of normal driving, for each phase of the armature coil, the motor driving circuit generates the driving signal which includes a first PWM signal which on/off controls one of the upper arm switching element and the lower arm switching element, and generates a constant voltage signal which on/off controls the other of the upper arm switching element and the lower arm switching element,
   wherein the motor control unit performs a first driving control and a second driving control for the motor driving circuit in the overlap time period,
   wherein the first driving control includes supplying a second PWM signal having a frequency higher than that of the first PWM signal to the upper arm switching element or the lower arm switching element, to which the first PWM signal is supplied immediately before the overlap time period, and, at a start time of the overlap time period, temporally increasing an on-duty of the first PWM signal which is supplied to a switching element of a phase which is switched subsequently, to thus increase a number of pulses of the second PWM signal, and
   wherein the second driving control includes supplying a third PWM signal having a frequency higher than that of the first PWM signal to the lower arm switching element or the upper arm switching element, to which the constant voltage signal is supplied immediately before the overlap time period, and supplying the first PWM signal having an on-duty which is temporarily increased, to the upper arm switching element or the lower arm switching element, to which the first PWM signal is supplied during the overlap time period.

2. The driving control apparatus according to claim 1, wherein when performing the second driving control, while the upper arm switching element or the lower arm switching elements, to which the first PWM signal is supplied, is off during the overlap time period, the motor control unit turns on the lower arm switching element or the upper arm switching element, to which the third PWM signal is supplied.

3. The driving control apparatus according to claim 1, wherein when performing the second driving control, the motor control unit starts the overlap time period of supplying the constant voltage signal to the lower arm switching element or the upper arm switching element, in an on-time period of the upper arm switching element or the lower arm switching element, to which the first PWM signal is supplied.

4. The driving control apparatus according to claim 1, wherein when performing the second driving control, the motor control unit ends the overlap time period of supplying the constant voltage signal to the lower arm switching element or the upper arm switching element, in an on-time period of the upper arm switching element or the lower arm switching element, to which the first PWM signal is supplied.

5. The driving control apparatus according to claim 1, further comprising:
   a rotating position detection unit which detects a rotating position of the rotor,
   wherein the motor control unit includes:
      an energization switching timing control unit which performs a timing control of the overlap time period and a timing control of the first, second and third PWM signals in the overlap time period, based on the rotating position detected in the rotating position detection unit; and
      a duty changing unit which controls on-duty of the first, second and third PWM signals in the overlap time period.

* * * * *